Nov. 8, 1949 W. H. RUPP 2,487,184
BUTADIENE PURIFICATION
Filed July 6, 1944
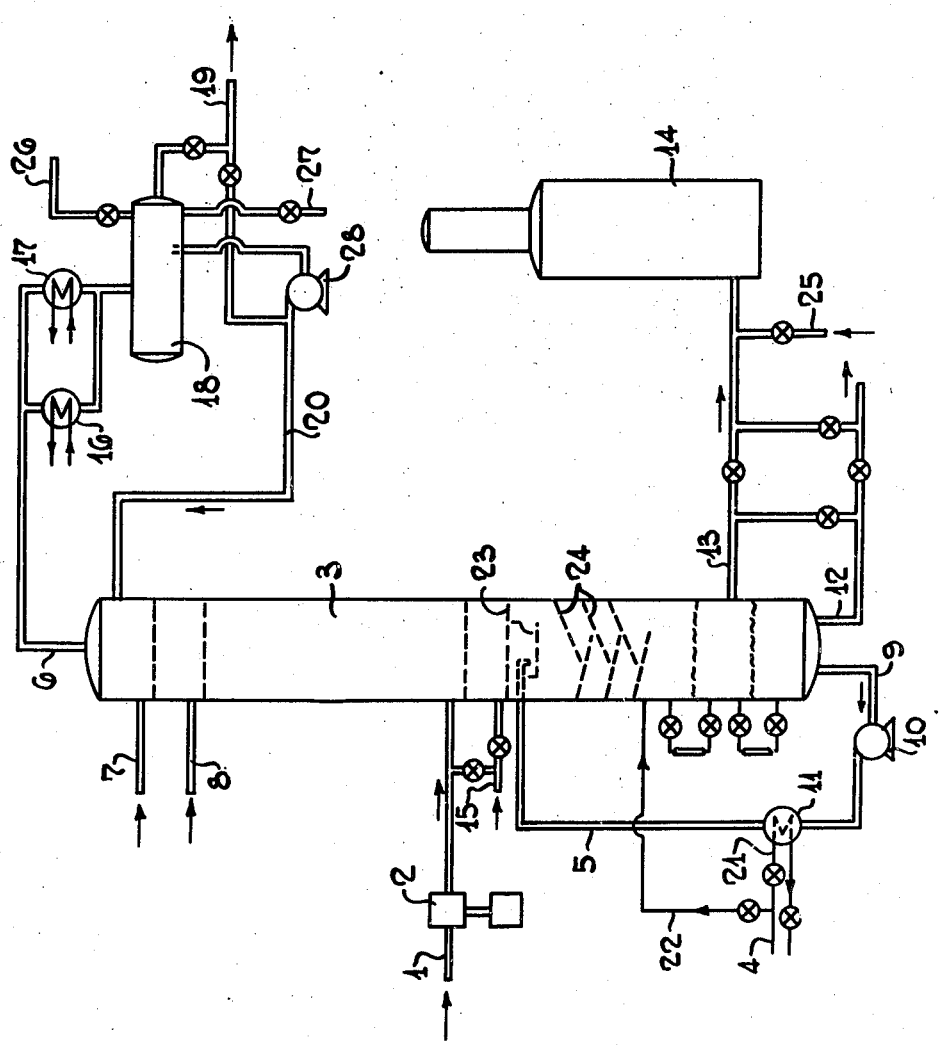
Walter H. Rupp Inventor
By Th. Young Attorney Patented Nov. 8, 1949

2,487,184

UNITED STATES PATENT OFFICE 2,487,184

BUTADIENE PURIFICATION

Walter H. Rupp, Mountainside, N. J., assignor to Standard Oil Development Company, a corporation of Delaware Application July 6, 1944, Serial No. 543,695

8 Claims. (Cl. 202—66)

This invention relates to the purification of diolefins and particularly to the purification of diolefins which have been separated from a mixture of saturated and unsaturated hydrocarbons by the use of a copper solution.

Diolefins, particularly butadiene, when separated from mixtures of saturated and unsaturated hydrocarbons by the use of a copper solution such as ammonical cuprous acetate must be further purified before they are used in the manufacture of rubber as they are contaminated with other compounds such as propadiene, pentadiene, acetylene polymers and similarly heavy end compounds such as engine oil lubricants together with some sulfur compounds. The presence of these constituents in the diolefin is undesirable. The rate of polymerization of the diolefins into rubber is greatly decreased thereby reducing the capacity of the rubber plants. These impurities are definite poisons to the polymerization of a diolefin into rubber. The presence of acetylene polymers are additionally a hazard as they are potentially explosive under certain conditions, particularly in high concentrations and in a dry state. Due to the highly unsaturated character of the diolefins, acetylene polymers and various copolymers of these compounds, auto-oxidation forming dangerous explosive peroxide compounds will occur if air or oxygen is present in the purification step.

An object of this invention is to remove the undesirable ingredients particularly those undesirable ingredients heavier than the desired diolefin from a diolefin extract obtained from a mixture of hydrocarbons formed by cracking petroleum oils. A further object is to purify butadiene under conditions which render the potentially dangerous contaminants harmless. These and other objects of the invention will be more clearly understood on reading the following description with reference to the attached drawing.

The raw diolefin in vapor phase is passed by means of pipe 1, after passing through compressor 2 into a tower 3 equipped with bubble cap plates. The pressure of the diolefin extract entering tower 3 is about 80 lbs./sq. in. though higher and lower pressures may be used. Steam is introduced preferably through pipes 4 and 21 to supply closed heat in heater 11. If air and oxygen-free steam is available the heating steam can be introduced directly into the tower 3 through pipes 4 and 22. The amount of steam being passed into heater 11 is regulated so that a temperature of 180-200° F. is maintained uniformly within the tower by means of a circulating aqueous stream flowing through line 9 from tower 3, thence to pump 10 through heater 11 and line 5 back to tower 3 where the circulating stream mixes with liquid overflow from plate 23 and flows over baffles 24. The purified vapors evolved from the raw diolefin feed are expelled through pipe 6 and as they rise within the tower may be washed by the use of clean water introduced by means of pipe 7. Either an alkaline or acidic solution may likewise be used with the same purpose which is introduced into the tower by means of pipe 8 at a lower plate in the tower. The water or aqueous solution, whichever is being used, passes in countercurrent flow to the vapors evolved from the butadiene extract and prevents dry spots in the tower where the explosive contaminants might detonate. The aqueous solution passes downwardly through the tower 3 and is removed by means of pipe 9 and recycled by means of pump 10 after being heated by means of heater 11 or may be withdrawn from the system by means of pipe 12. Sometimes a petroleum oil, preferably composed of saturated hydrocarbons having at least 5 carbon atoms to the molecule may be used as a flux oil to aid in the removal of the heavier and potentially explosive constituents which pass downwardly through the tower 3 and are removed by means of pipe 13 from an oil layer or in an emulsified state and passed to a flare tower 14 where the oil, heavy contaminants and explosive ingredients may be burned. The flux oil may be introduced into the system by means of pipe 15. Fuel gas to aid burning the residue can be added through line 25 if desired. The vapors evolved from tower 3 in pipe 6 are condensed by means of heat exchangers 16 and 17, passed to separator 18 from which they are recovered as substantially pure butadiene through pipe 19. A part of the purified butadiene in separator 18 is recycled by means of pipe 20 and pump 28 to the upper part of tower 3 to improve separation of the heavy contaminants. Pipe 26 serves to vent uncondensed impurities and pipe 27 is used for draining water from separator 8.

As a specific example, raw butadiene from the copper salt extraction section contains between 0.2 to 2.0 weight percent of compounds having more than 6 carbon atoms per molecule. The percentage of acetylene compounds in the raw butadiene feed is between 0.05 to 0.5 weight percent and the tower bottoms will contain from 5–50 weight percent of acetylene compounds. Without purifying the raw butadiene by fractionation it has been found that the rate of polymerization of the butadiene into Buna S rubber is from 50–80% slower than with the purification steps carried out.

This process is particularly applicable to all fractionation systems involving light ends of 2 to 6 carbon atoms where dangerous polymers of the acetylene and peroxide type must be handled. It is also particularly applicable where oil skin temperatures must be kept very close to the process oil temperature required and where fouling of heat exchangers by polymer accumulation on heating surfaces is encountered.

I claim:

1. In the purification of a diolefin from a liquid mixture containing higher boiling contaminants and potentially explosive compounds of acetylene, the steps which comprise circulating and heating a water stream removed from the mixture of diolefin and contaminants and thereafter mixing the thus heated water stream free of oxygen with the liquid mixture of the diolefin and contaminants at a temperature sufficiently high to vaporize the diolefin and leave the contaminants including the compounds of acetylene mixed with the water.

2. The process according to claim 1 in which the diolefin is butadiene.

3. The process according to claim 1 in which the temperature in the fractionation zone does not exceed 200° F.

4. In the purification of a liquefied butadiene extract obtained by extraction from a mixture of hydrocarbons with a copper salt solution which leaves acetylene compound contaminants in the extract, the steps which comprise heating the butadiene extract mixed with an aqueous liquid stream free of oxygen to evolve butadiene vapors, and washing the evolved vapors with a liquid hydrocarbon flux oil in which acetylene compound contaminants of the extract are retained.

5. In the purification of butadiene obtained in an extract contaminated with acetylene compound by extracting a mixture of hydrocarbons with an ammoniacal cuprous acetate solution, the steps which comprise vaporizing butadiene from the extract at a temperature of 180°—200° F. controlled by admixing a heated aqueous liquid stream free of oxygen, separating resulting vapors of butadiene from residual acetylene compound contaminants left mixed with the aqueous liquid stream, and condensing said separated vapors of butadiene.

6. In the purification of butadiene that is contaminated with higher boiling and potentially explosive acetylene compounds in an extract obtained by extracting from a mixture of hydrocarbons with an ammoniacal cuprous acetate solution, the steps which comprise heating the extract to a temperature of 180–200° F. in the presence of an aqueous liquid stream free of oxygen to evolve butadiene vapors and leave an extract residue containing acetylene compounds mixed with water, washing the evolved vapors with a petroleum oil composed of saturated hydrocarbons having at least 5 carbon atoms to the molecule, and condensing the washed evolved vapors as a separated pure butadiene distillate.

7. In the purification of a diolefin from a liquid mixture containing higher boiling contaminants and potentially explosive compounds of acetylene, the steps which comprise circulating and heating a water stream removed from the mixture of diolefin and contaminants, thereafter mixing within a fractionating zone the thus heated water stream free of oxygen with the liquid mixture of the diolefin and higher boiling contaminants, including said compounds of acetylene at a temperature sufficiently high to vaporize the diolefin, contacting an aqueous wash liquid counter-currently with the diolefin vapors within said fractionation zone, recovering a substantially pure diolefin distillate by condensation of the thus washed vapors, and leaving the high boiling contaminants, including said compounds of acetylene, mixed with the water.

8. The process according to claim 7 in which the diolefin is butadiene.

WALTER H. RUPP.

REFERENCES CITED

The following references are of record in the file of this patent:

UNITED STATES PATENTS

| Number | Name | Date |
|---|---|---|
| 2,365,912 | Souders | Dec. 26, 1944 |
| 2,382,603 | Buell | Aug. 14, 1945 |
| 2,388,834 | Douslin et al. | Nov. 13, 1945 |

FOREIGN PATENTS

| Number | Country | Date |
|---|---|---|
| 115,765 | Australia | Aug. 21, 1942 |
| 548,734 | Great Britain | Oct. 22, 1942 |